US012054985B2

(12) United States Patent
Zhou

(10) Patent No.: US 12,054,985 B2
(45) Date of Patent: Aug. 6, 2024

(54) SECURING MECHANISM FOR BLIND FASCIA

(71) Applicant: LES ENTREPRISES SMARTLUX INC., Saint-Laurent (CA)

(72) Inventor: Fan Zhou, Montreal (CA)

(73) Assignee: LES ENTERPRISES SMARTLUX INC., Saint-Laurent (CA)

( * ) Notice: Subject to any disclaimer, the term of this patent is extended or adjusted under 35 U.S.C. 154(b) by 65 days.

(21) Appl. No.: 17/542,474

(22) Filed: Dec. 5, 2021

(65) Prior Publication Data

US 2022/0178200 A1 Jun. 9, 2022

(30) Foreign Application Priority Data

Dec. 7, 2020 (CA) ................................ CA 3101796

(51) Int. Cl.
*E06B 9/323* (2006.01)

(52) U.S. Cl.
CPC .................................... *E06B 9/323* (2013.01)

(58) Field of Classification Search
CPC . E06B 9/323; E06B 9/266; E06B 9/40; E06B 9/42; A47H 2/00; A47H 1/10; A47H 1/12; A47H 1/13
See application file for complete search history.

(56) References Cited

U.S. PATENT DOCUMENTS

| | | | | | |
|---|---|---|---|---|---|
| 3,029,465 | A * | 4/1962 | Graber | A47H 15/04 | 248/265 |
| RE29,979 | E * | 5/1979 | Guebert | A47H 2/00 | 24/342.1 |
| 5,330,821 | A * | 7/1994 | Lo | A47H 2/02 | 248/265 |
| 2009/0032200 | A1* | 2/2009 | Zhang | E06B 9/323 | 160/38 |
| 2022/0065035 | A1* | 3/2022 | Tao | E06B 9/50 | |

FOREIGN PATENT DOCUMENTS

DE 202018100943 U1 * 4/2018

OTHER PUBLICATIONS

English Translation of DE-202018100943-U1 (Year: 2018).*

* cited by examiner

*Primary Examiner* — Johnnie A. Shablack
*Assistant Examiner* — John W Hanes, Jr.
(74) *Attorney, Agent, or Firm* — Lei Gao

(57) ABSTRACT

A securing mechanism for blind fascia is provided. The mechanism includes a removable fascia connector that is movable between an engaged position that effects the securing of the fascia and a disengaged position that allows the fascia to be removed.

13 Claims, 20 Drawing Sheets

SECURING MECHANISM FOR BLIND FASCIA

CROSS REFERENCE TO RELATED APPLICATIONS

This application claims priority of Canadian patent application No. 3101796, filed on Dec. 7, 2020, the content of which is incorporated herein by reference in its entirety.

TECHNICAL FIELD

This disclosure relates to blind assembly for building openings in general. In particular, this disclosure relates to a securing mechanism for removable fascia of such blind assemblies for the building openings, such as windows and doors.

BACKGROUND

Blinds, for example, roller blinds or roller shades often includes a fascia or trim panel to obscure certain parts of the blinds, for example, the mechanical mechanism, from view, often for aesthetic purposes.

There are many mechanisms for securing the fascia to the rest of the blind. However, many such mechanisms are cumbersome to use, loosens after repeated use, are complex, and/or difficult to install or remove. Some of these mechanisms expose certain mechanical parts such that the appearance is less than desirable.

SUMMARY

This disclosure provides a securing mechanism to removably secure a fascia to the end plate of a blind assembly, for example, a roller shade or roller blind.

A mechanism for releasably securing a fascia to an end plate of a blind assembly is provided. The mechanism includes a fascia connector removably attached to the end plate. The fascia connector comprises a first securing counterpart that is movable between an engaged position that the first securing counterpart engages the fascia and a disengaged position that the first securing counterpart disengages from the fascia.

In some embodiments, the fascia connector includes a second securing counterpart, and the end plate includes a third securing counterpart. The second and the third securing counterparts cooperate such that the movement of the fascia connector relative to the end plate is restricted.

In some embodiments, the fascia connector includes a stem connecting the first and the third securing counterpart.

In some embodiments, the third securing counterpart includes a receptacle and an opening to the receptacle. The opening is sized and shaped such that the stem is movable through when a width of the cross-section is substantially parallel to a width of the opening, while the stem is not movable through the opening when the width of the cross-section is at a predetermined angle relative to the width of the opening.

In some embodiments, the fascia connector includes a handle operatively connected to the stem. The handle is configured such that, when the stem is disposed in the receptacle, a gravitational force is applied to the handle, causing the stem to move to a position that prevents the stem from moving through the opening.

In some embodiments, the fascia includes a fourth securing counterpart for engaging the first securing counterpart.

A blind assembly is also provided that includes the mechanism for releasably securing a fascia as disclosed herein to an end plate of the blind assembly.

A kit is also provided for removably securing a fascia to an end plate of a blind assembly. The kit includes a fascia connector

BRIEF DESCRIPTION OF THE DRAWINGS

Reference will now be made, by way of example, to the accompanying drawings which show example embodiments of the present disclosure, and in which.

DETAILED DESCRIPTION

In the Summary and in the Description, and in the accompanying drawings, reference is made to particular features (including method steps) of the disclosure. It is to be understood that the disclosure in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm, and whose upper limit is 100 mm.

Figure 1A:
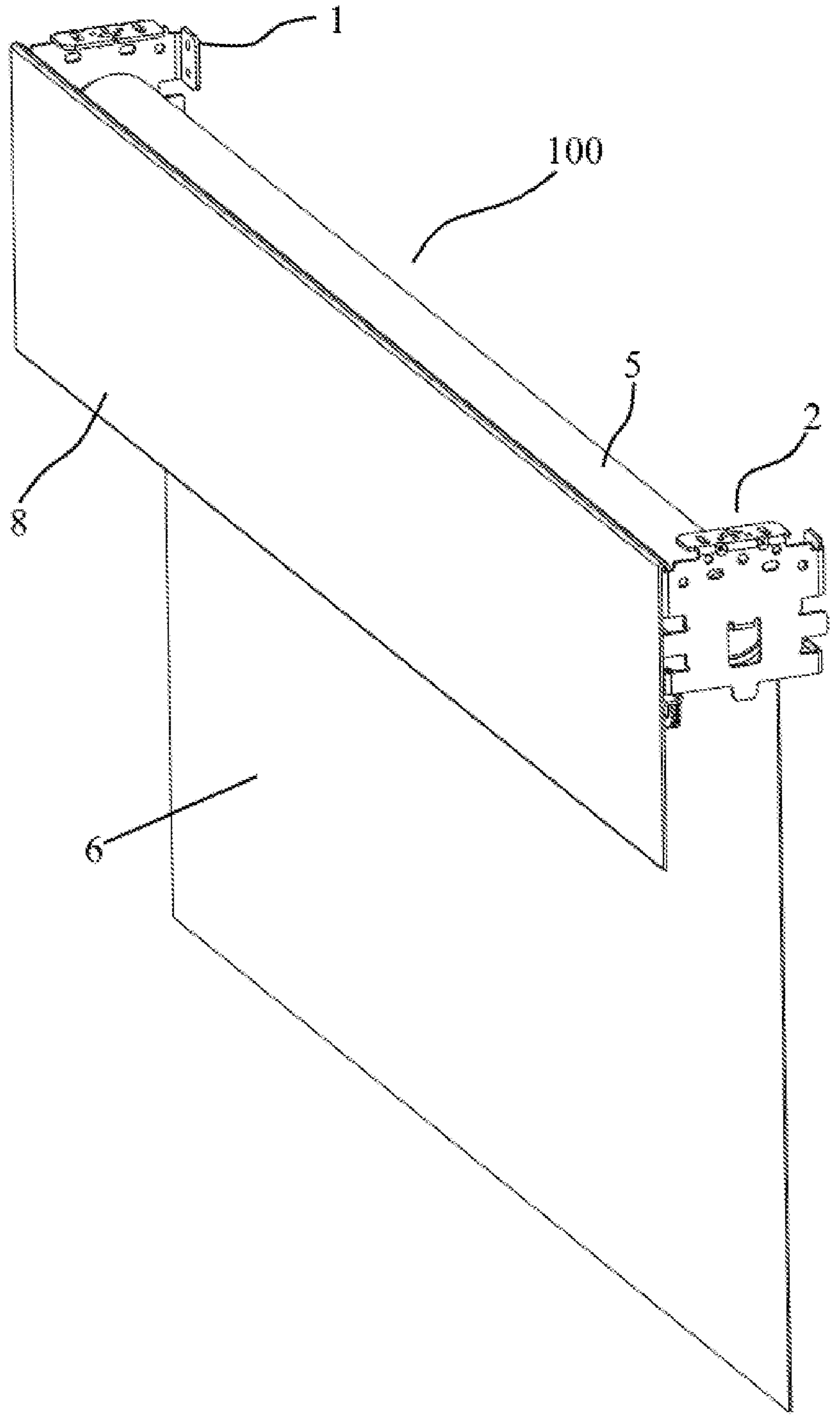
FIG. 1A is a perspective view of one embodiment of a blind assembly with the fascia connected.
Figure 1B:
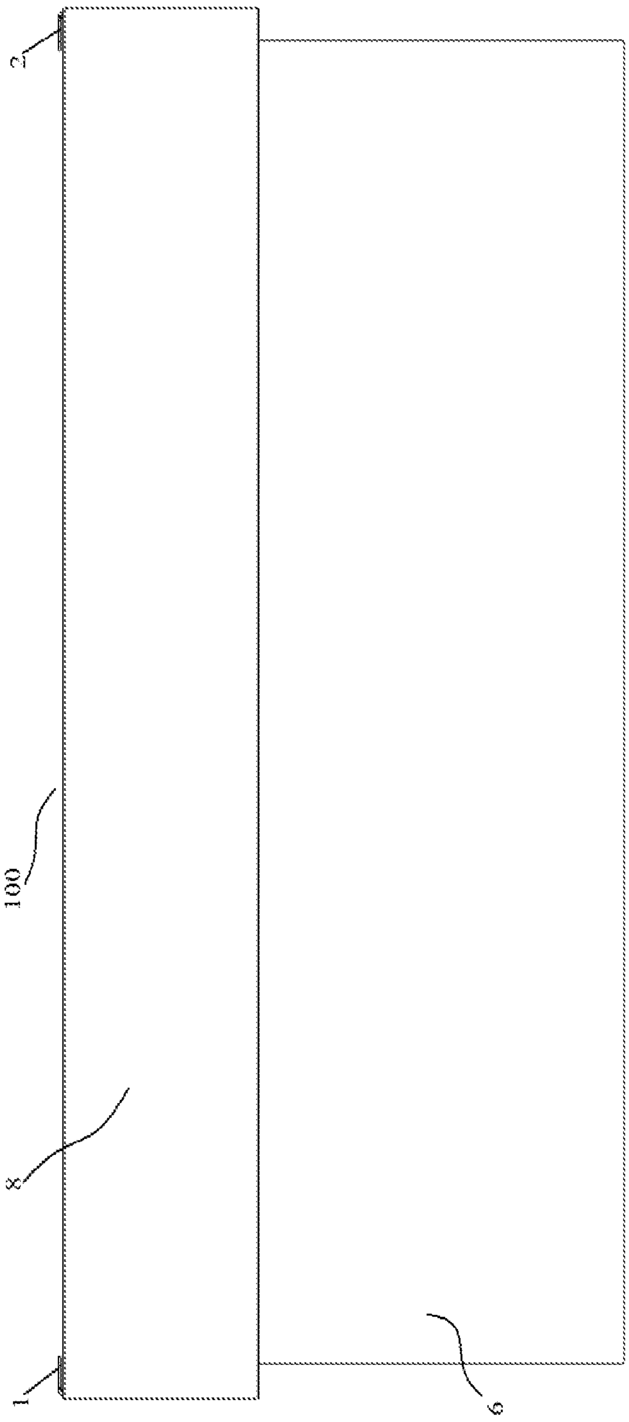
FIG. 1B is front view of the blind assembly with the fascia connected.
Figure 1C:
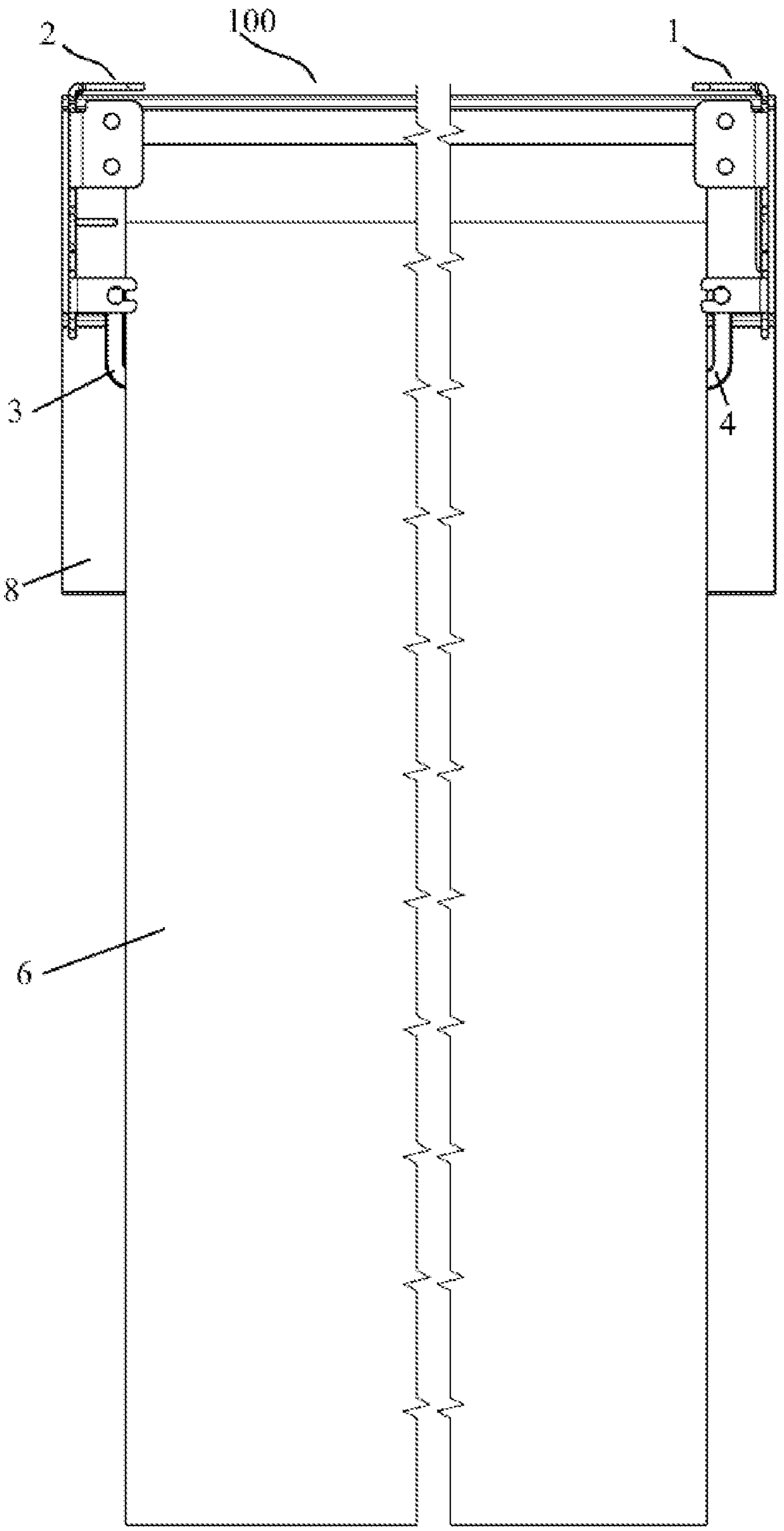
FIG. 1C is a back view of the blind assembly with the fascia connected.

FIGS. 1A, 1B, and 1C show a roller blind 100, generally comprising a roller tube 5, a panel of blind material 6, a fascia 8, and end plates 1 and 2. The fascia connectors 3 and 4 effects the attachment of the fascia 8 is to the end plates 1 and 2 to obscure the roller tube 5 and the mechanism that operates the blind, and to provide a desirable appearance. In some embodiments, only one of the fascia connectors 3 and 4 is needed.

Figure 2:
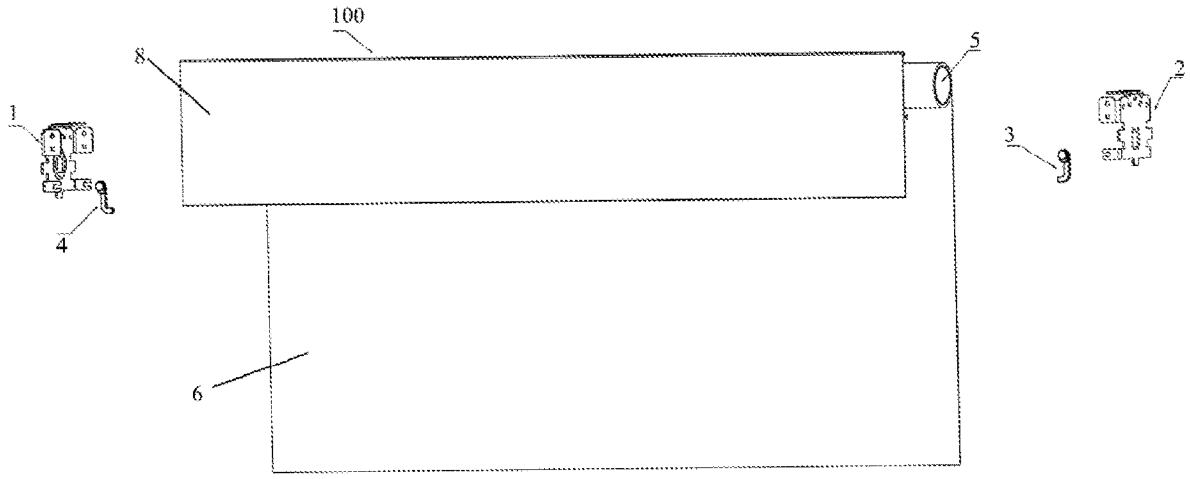
FIG. 2 is an exploded view of the blind assembly of FIGS. 1A, 1B, and 1C.
Figure 3A:
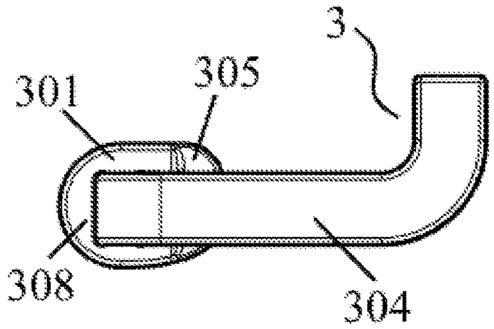
FIGS. 3A, 3B, 3C, and 3D are the front view, back view, right side view and bottom view of the fascia connector.
Figure 3B:
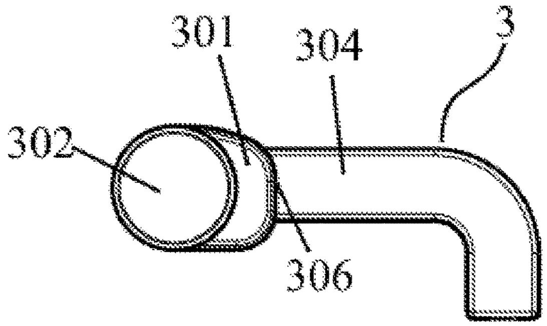
Figure 3C:
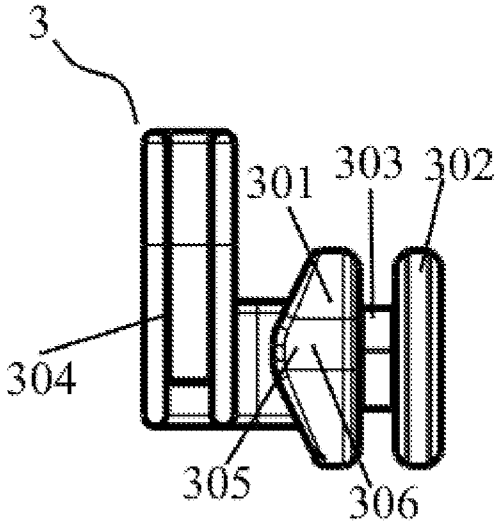
Figure 3D:
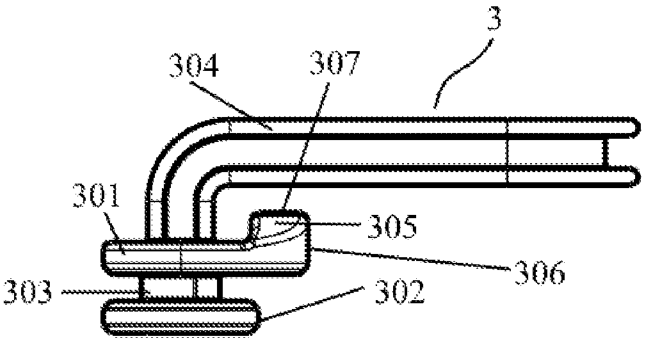

FIG. 2 is an exploded view of the blind assembly, which generally comprises the end plates 1 and 2, fascia connectors 3 and 4, roller tube 5, and a panel of blind material 6.

FIGS. 3A, 3B, 3C, and 3D are the front view, back view, right side view, and bottom view of the fascia connector 3, which generally includes a securing counterpart 301, a securing counterpart 302, and a stem 303 connecting the securing counterpart 301 and the securing counterpart 302. The fascia connector 3 also includes a handle 304.

The securing counterpart 301 comprises a generally flat plate 308 and a protrusion 305 configured thereon, and the protrusion 305 has a top surface 307. The plate 308 of the securing counterpart 301 is of a generally elongated shape. For example, the plate 308 of the securing counterpart 301 may be generally oblong, oval, stadium- or cam-shaped.

A portion of the edge of the securing counterpart 301 defines a surface 306, and the surface 306 is configured adjacent the protrusion 305. The surface 306 is generally flattened. In some embodiments, the surface 306 is not flattened. For example, the surface 306 may comprise multiple teeth. In some embodiments, the surface 306 may be rough, for example, striated, tessellated, or reticulated. The protrusion 305 becomes thicker away from the edge of the plate of the securing counterpart 301. For example, the protrusion 305 may be shaped like a quarter spheroid or ellipsoid, or a truncated quarter spheroid or ellipsoid.

The securing counterpart 302 is circular. The securing counterpart 302 is configured such that it does not engage the fascia 8. For example, the dimensions on the plane defined by the securing counterpart 302 is no larger than the smallest dimension on the plane defined by the securing counterpart 301.

In some embodiments, the handle 304 is detachable from the fascia connector 3. In some embodiments, the fascia connector 3 does not include a handle 304.

The fascia connector 4 is generally mirrored of the fascia connector 3.

FIGS. 4A, 4B, 4C, 4D, 4E and 4F are the right side view, A-A, B-B, C-C, D-D, and E-E sectional views of the blind assembly 100, in which the fascia 8 is secured to the end plates 1 and 2.

The panel of blind material 6 is disposed on the roller tube 5. The panel of blind material 6 may include plastic, fabric, or venetian blind.

The end plate 2 includes a securing counterpart 201 that extends, for example, substantially perpendicularly, from the body 206 of the end plate 2. The securing counterpart 201 includes an opening 203 sized and shaped such that the stem 303 may be disposed in the receptacle 204 through the opening 203, whereby a portion of the securing counterpart 201 is disposed between the securing counterpart 301 and the securing counterpart 302. In some embodiments, the securing counterpart 201 extends at desired angles from the body 206 of the end plate 2. In some embodiments, the securing counterpart 201 is rotatable relative to the end plate 2 to reach a desirable angle.

The end plate 1 is substantially mirrored of the end plate 2, which includes a securing counterpart 101. The securing counterpart 101 includes an opening 103 sized and shaped such that the stem 403 may be disposed in the receptacle 104 through the opening 103, such that the securing counterpart 101 is disposed between the securing counterpart 401 and the securing counterpart 402.

The end plate 2 includes an engagement counterpart 202, which includes an upwardly extending edge in the upper portion of the end plate 2. In some embodiments, the engagement counterpart 202 includes an upwardly extending ledge or flange. The engagement counterpart 202 is configured in an upper portion of the end plate 2, for example, at or near the top of the end plate 2. The end plate 1 is generally a mirror image of the end plate 2.

The fascia 8 includes a fascia body 807 that includes an interior surface 808. A securing counterpart 801 is disposed separately from an engagement counterpart 802 on the body 807. The securing counterpart 801 and the engagement counterpart 802 are disposed on the surface 808 of the fascia 8, and the surface 808 is designed to face the roller tube 5 when the fascia is installed. The securing counterpart 801 includes a ledge 803 that extends substantially perpendicularly from the interior surface 808, and a ridge 804 that extends substantially perpendicularly from the ledge 803 toward the engagement counterpart 802. The securing counterpart 801 is configured to engage the securing counterpart 301 and the securing counterpart 401 of the fascia connectors 3 and 4.

The engagement counterpart 802 is configured on the surface 808 at a location separate from the securing counterpart 801. The engagement counterpart 802 includes a ledge 805 that extends substantially perpendicularly from the interior surface 808. A ridge 806 extends substantially perpendicularly from the ledge 805 toward the securing counterpart 801. The securing counterpart 801 is configured in a portion of the fascia body 807 separate from the engagement counterpart 802. In some embodiments, the securing counterpart 801 is configured at the bottom of the fascia body 807. The engagement counterpart 802 engages end plate 2 by engaging the engagement counterpart 202.

In some embodiments, the securing counterpart 801 is configured at the bottom of the fascia body 807.

In some embodiments, the fascia body 807 is sized and shaped for the desired appearance while providing the securing counterpart 801 and the engagement counterpart 802. In some embodiments, the engagement counterpart 802 and the securing counterpart 801 are configured at desired locations such that the fascia 8 obscures the mechanism and the roller tube 5 of the roller bind 100. In some embodiments, each of the ridges 804 and 806, independently, is continuous or comprises discrete portions.

The stem 303 is disposed in the receptacle 204 of the securing counterpart 201 through the opening 203. The stem 403 is disposed in the receptacle 104 through the opening 103. The securing counterpart 302 of the fascia connector 3 and the securing counterpart 402 of the fascia connector 4 are sized and shaped such that they will not fall out through the receptacle 204 and the receptacle 104 other than through the opening 203. For example, the securing counterpart 302 and the receptacle 204 may be generally circular and the securing counterpart 302 has a diameter that is larger than the diameter of the receptacle 204. In some embodiments, the securing counterpart 302 and the securing counterpart 402 may be square, oval, cam-shaped.

Figure 4A:
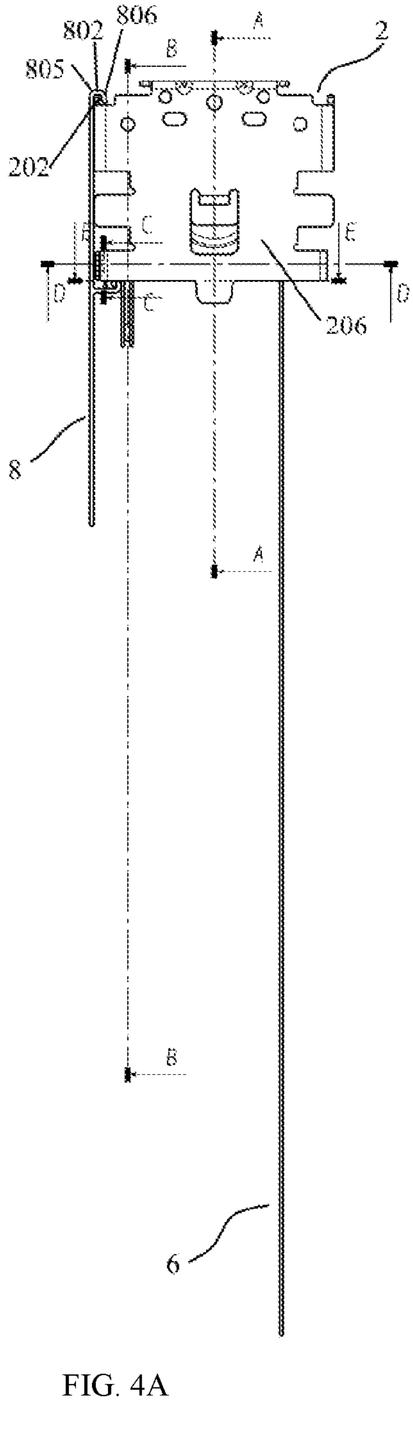
FIGS. 4A, 4B, 4C, 4D, 4E and 4F are the right side view, A-A, B-B, C-C, D-D, and E-E sectional views of the blind assembly of FIGS. 1A, 1B, and 1C.
Figure 4B:
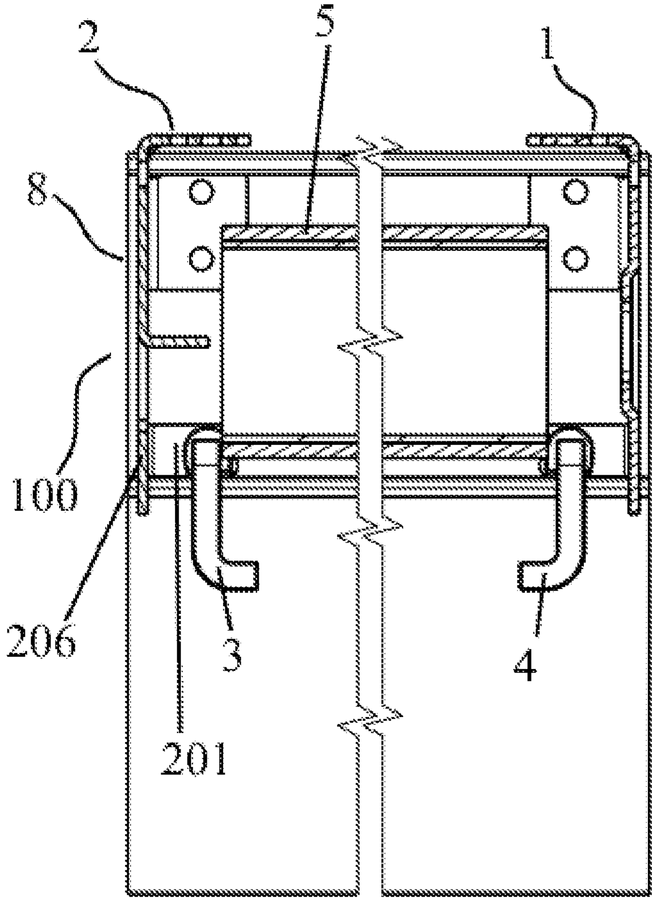
Figure 4C:
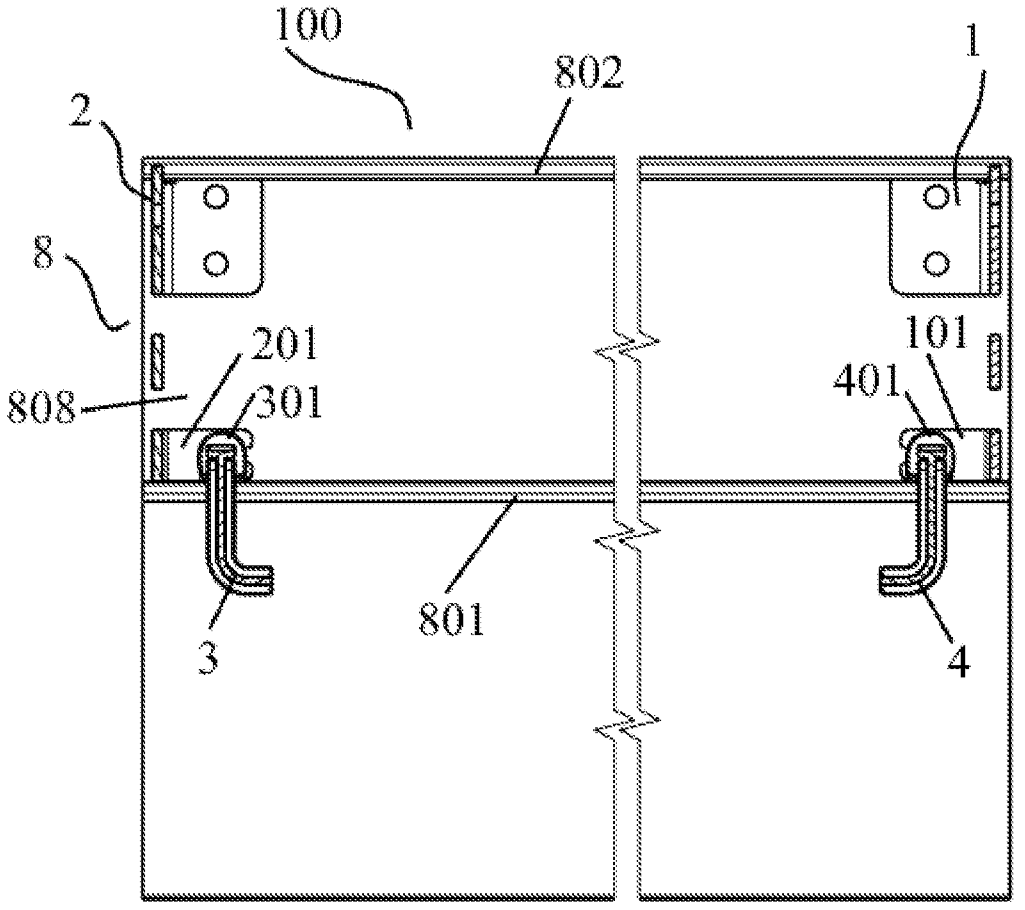
Figure 4D:
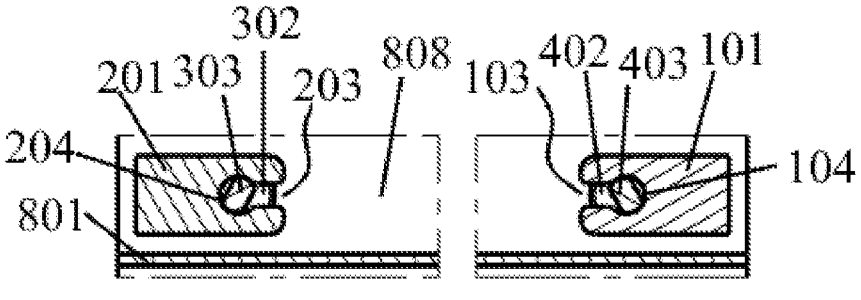
Figure 4E:
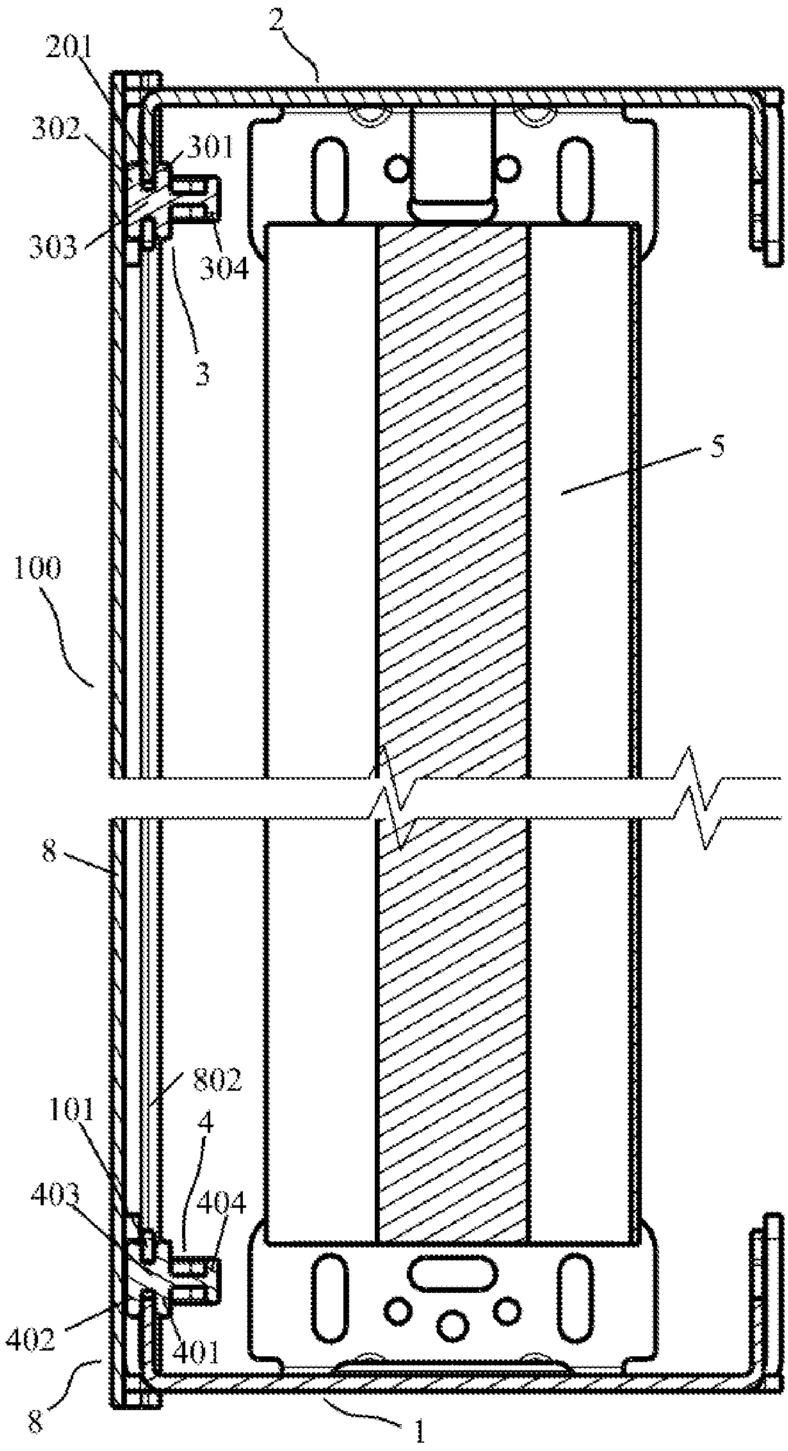
Figure 4F:
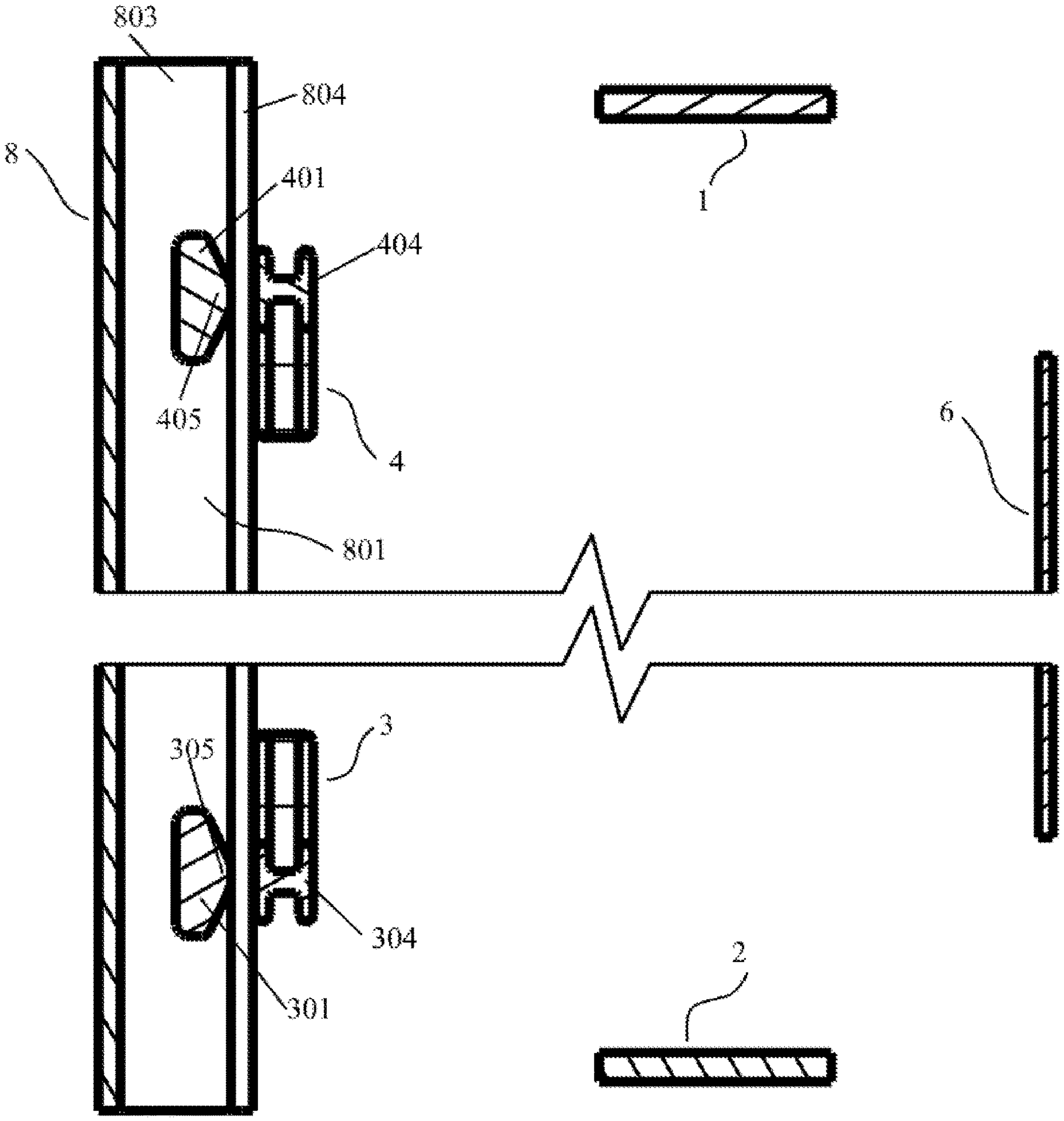

When the fascia 8 is secured to the end plate 2, the fascia connector 3 is positioned such that the stem 3 cannot be removed from the receptacle 204 by moving through the opening 203. As shown in FIG. 4D, the stem 303 engages the receptacle 204 and the dimensions of the stem 303 that allow it to move through the opening 203 are not aligned with the opening 203.

The stem 303 has a generally elongated cross-section. The stem 303 includes at least one dimension on the plane defined by the cross-section that is smaller than the width of the opening 203, which allows the stem 303 to move through the opening 203 in certain positions. There is at least one other dimension on the plane defined by the cross-section that is larger than the width of the opening 203 such that the stem 303 cannot move through the opening 203 when this dimension is aligned with the width of the opening 203, for example by being substantially parallel to the width of the opening 203. For example, the width of the elongated shape may be smaller than the width of the opening 203, while the length of the elongated shape may be larger than the width of the opening. In some embodiments, the stem 303 is movable through the opening when the width of the stem 303 is substantially parallel to the width of the opening 203 or when the width of the stem 303 is within a predetermined range of angles relative to the width of the opening 203, while the stem 303 is not movable through the opening 203 when it is at an angle beyond the predetermined range of angles relative to the width of the opening 203.

The cross-section of the stem 303 has two rounded sides away from each other along the length of the cross-section to facilitate the rotation of the stem 303 in the receptacle 204. For example, the cross-section of the stem 303 may be stadium shaped. In some embodiments, the rounded sides of the stem 303 and the receptacle 204 are concentric. In some embodiments, the rounded sides are disposed at angles different from 180 degrees from each other. In some embodiments, there are more than two protruding surfaces that are configured to contact the interior surface of the receptacle 204 to facilitate rotation of the stem 303 within the receptacle 204.

When the fascia 8 is secured to the end plate 2, the engagement counterpart 802 engages the engagement counterpart 202, the securing counterpart 301 of the fascia connector 3 engages the securing counterpart 801, and the securing counterpart 401 of the fascia connector 4 engages the securing counterpart 801. In particular, the protrusions 305 and 405 engage the ridge 804. In some embodiments, the surface 306 engages the ledge 803. In some embodiments, the fascia connector 4 similarly engages the ledge 803. In some embodiment, the securing counterpart 301 engages the securing counterpart 801 by engaging the ledge 803.

Each of the ledge 803, the ridge 804, the ledge 805, and the ridge 806, independently, may be continuous or discrete between end plates 1 and 2. As shown in FIG. 4C, the largest dimension defined by the securing counterpart 301 is generally perpendicular to the length of the securing counterpart 801. In some embodiments, only one of the fascia connectors 3 and 4 is used to secure the fascia 8 to the rest of the blind assembly 100.

In some embodiments, the center of stem 303 overlaps the center of the securing counterpart 301 and/or the securing counterpart 302. In some embodiments, the center of stem 303 is offset from the center of the securing counterpart 301 and/or the securing counterpart 302. In some embodiments, the securing counterpart 301 is configured to engage the securing counterpart 801 at a range of angles between the length of the securing counterpart 301 and the length of the securing counterpart 801. In some embodiments, the securing counterpart 301 may disengage from the securing counterpart 801 at a range of angles between the length of the securing counterpart 301 and the length of the securing counterpart 801.

The movement of the securing counterpart 302 away from the fascia body 807 is blocked by the securing counterpart 201.

FIGS. 5A, 5B, 5C, 5D, and 5E are the front view, back view, and sectional views taken along the A-A, B-B, and C-C lines of the fascia secured to one end plate of the blind assembly.

Figure 5A:
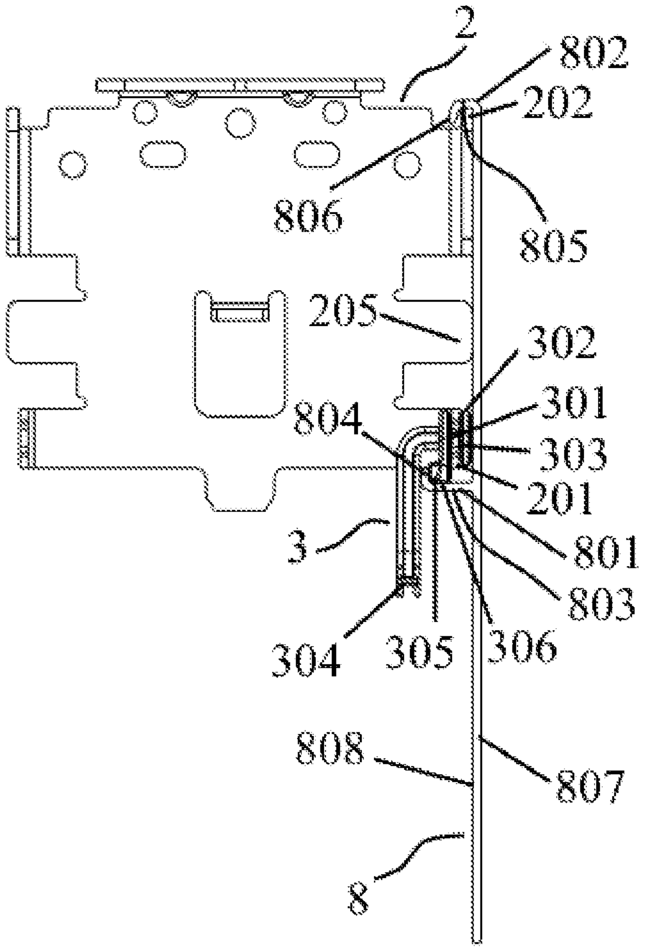
FIGS. 5A, 5B, 5C, 5D, and 5E are the front view, back view, and sectional views taken along the A-A, B-B, and C-C lines of the fascia secured to one end plate of the blind assembly.
Figure 5B:
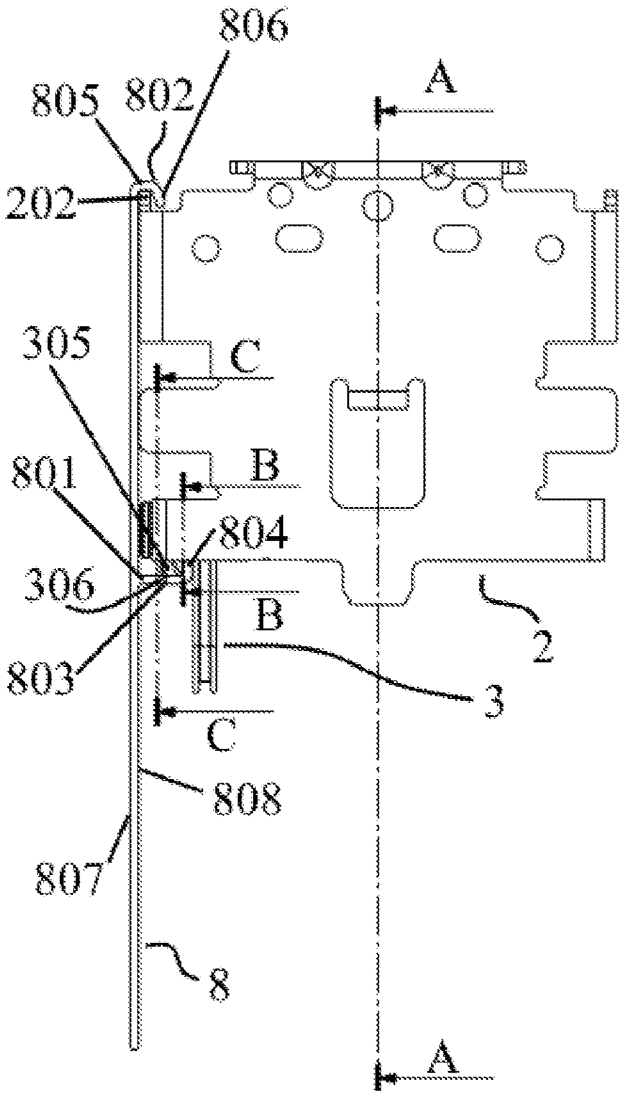
Figure 5C:
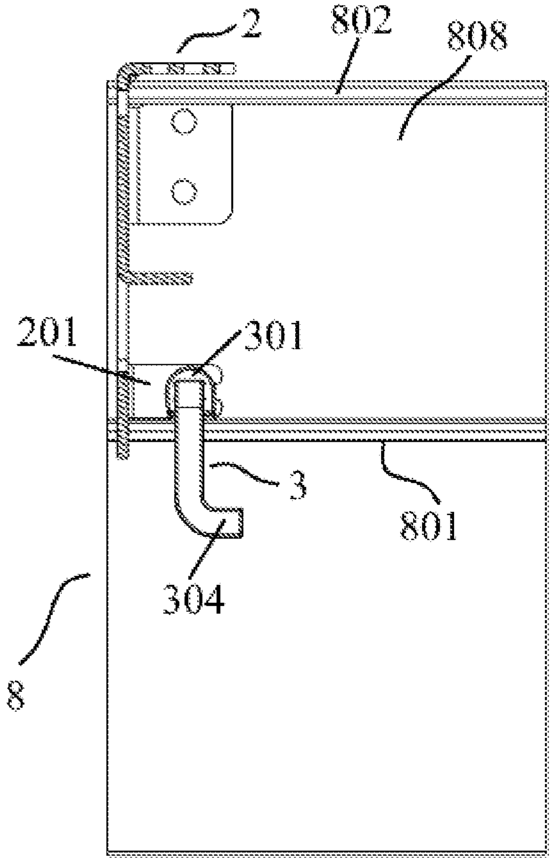
Figure 5D:
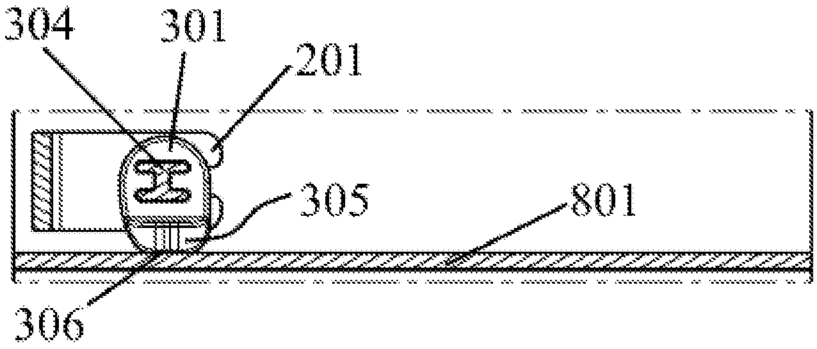
Figure 5E:
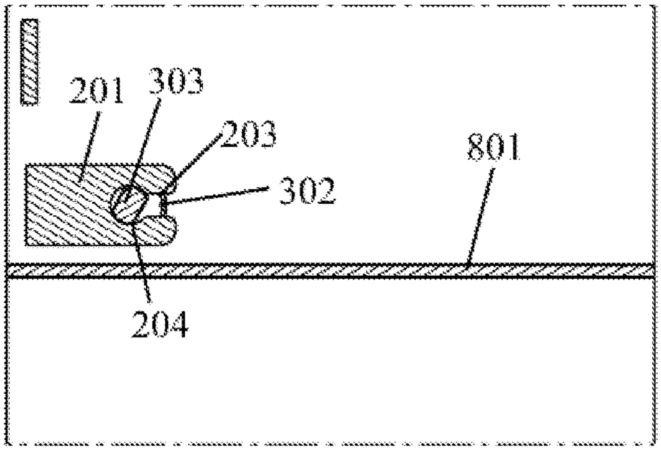

The handle 304 is moved to a position that causes the fascia connector 3 to move such that the fascia connector 3 engages the securing counterpart 801. For example, the handle 304 is in a generally downward position when the fascia 8 is secured to end plate 2 as shown in FIG. 5C. In some embodiments, the fascia connector 3 may be configured such that the handle 304 is at a desired angle relative to the securing counterpart 801 when the fascia connector 3 engages the securing counterpart 801.

The protrusion 305 engages the ridge 804 and the surface 306 engages the ledge 803. The engagement counterpart 202 engages the ledge 805 and the ridge 806. The protrusion 305 engages the ridge 804; the engagement counterpart 202 engages the ridge 806; the surface 306 applies a downward force to the ledge 803, which effects friction therebetween; and the engagement counterpart 202 applies an upward force on the ledge 805, which effects friction therebetween. In some embodiments, the engagement counterpart 802 does not include the ridge 806. In some embodiments, the securing counterpart 801 does not include the ridge 804, and the surface 306 applies a downward force to the ledge 803. In some embodiments, the fascia 8 is secured to the end plate 2 by the engagements between the ledge 803 and the surface 306 and between the engagement counterpart 202 and the ledge 805.

In some embodiments, the ledge 803 extends at an angle from the interior surface 808 toward the engagement counterpart 802, i.e., the ledge 803 is not extending perpendicularly from the interior surface 808. In some embodiments, the securing counterpart 801 does not include the ridge 804, and the protrusion 305 and the surface 306 both engage the ledge 803. In some embodiments, the ledge 805 extends at an angle from the interior surface 808 toward the securing counterpart 801. In some embodiments, the engagement counterpart 802 does not include the ridge 806 and the ledge 805 engages the engagement counterpart 802.

In some embodiments, the end plate 2 includes a protrusion 205 disposed between the engagement counterpart 202 and the securing counterpart 201. The protrusion 205 is configured to engages the fascia body 807 when the fascia 8 is installed.

The end plate 1 and the fascia connector 4 are generally mirrored from the end plate 2 and the fascia connector 3, respectively.

Reference is now made to FIGS. 6A, 6B, 6C, 6D, and 6E.

When the fascia 8 is released from the end plate 2, the fascia connector 3 is moved such that the securing counterpart 301 disengages from the securing counterpart 801, allowing the fascia 8 to be removed from the end plate 2.

The handle 304 is in a generally horizontal position. The fascia connector 3 may be configured such that the handle 304 is at a desired position when the securing counterpart 301 disengages from the securing counterpart 801. In some embodiments, there is a range of positions at which the fascia connector 3 disengages from the securing counterpart 801.

The stem 303 is at a position that does not allow the stem 303 to be moved through the opening 203 when the handle 304 is generally horizontal as shown in the Figures because the length of the cross-section of the stem 303 is not parallel to the length of the handle 304. For example, the angle between the length of the cross-section of the stem 303 and the length of the handle 304 may be between about 5 to about 90 degrees, for example about 10, 20, 30, 40, 50, 60, 70, 80, or 90 degrees. As a result, when the stem 303 is disposed in the receptacle 204, the gravitational force on the handle 304 causes the fascia connector 3 to rotate about the stem 303 such that the stem 303 is at a position that does not allow the stem 303 to be moved through the opening 203. In some embodiments, the fascia connector 3 is configured such that the stem 303 can be moved through the opening such that the fascia connector 3 can be removed when the handle is generally horizontal.

Figure 6A:
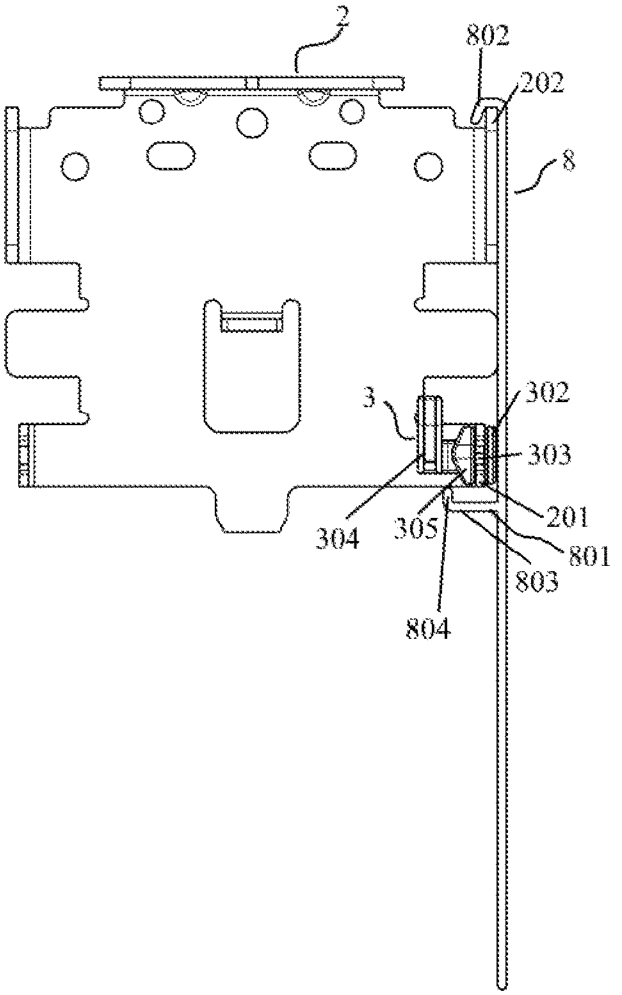
FIGS. 6A, 6B, 6C, 6D, and 6E are the front view, back view, and sectional views taken along the D-D, E-E, and F-F lines of the fascia released from the end plate.
Figure 6B:
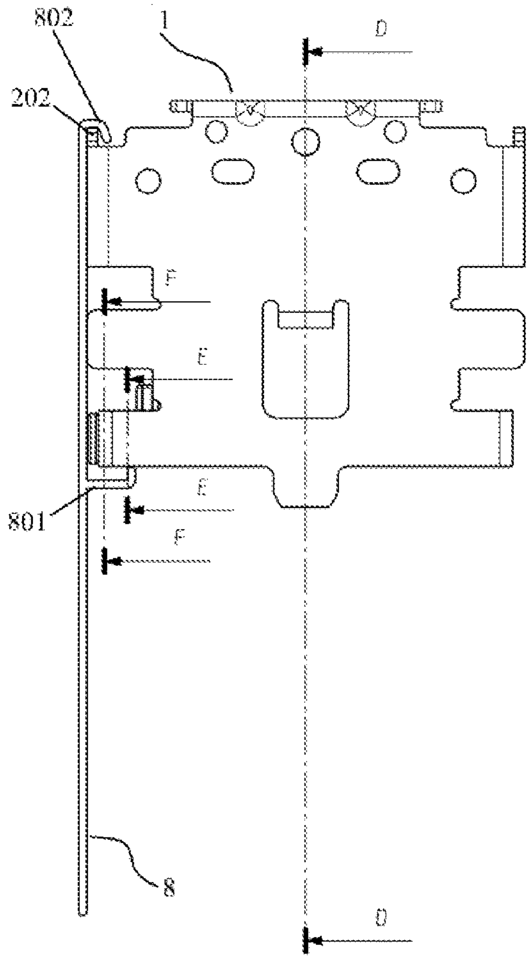
Figure 6C:
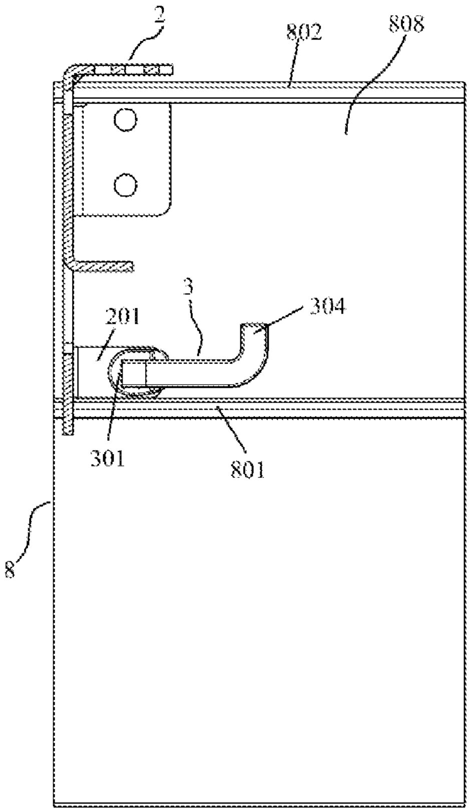
Figure 6D:
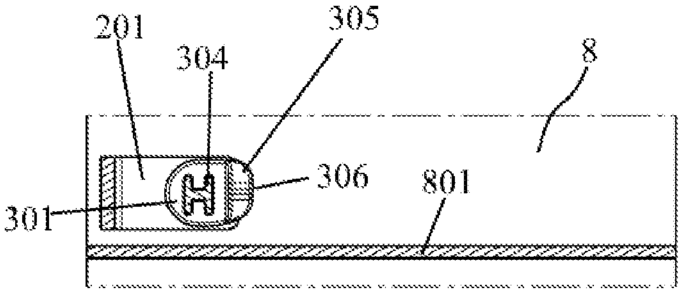
Figure 6E:
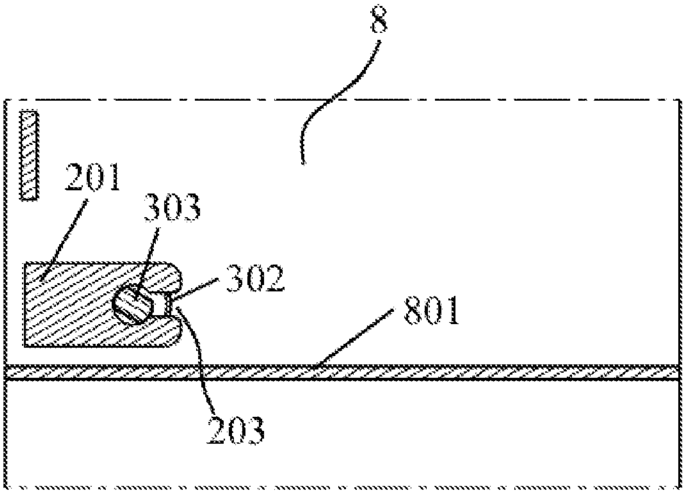

FIG. 6D shows a disengaged position at which the length of the securing counterpart 301 is substantially parallel to the length of the securing counterpart 801. FIG. 6E shows that the stem 303 is at a position that prevents the removal of the stem 303 through the opening 203 when the securing counterpart is at the position as shown in FIG. 6D.

Reference is now made to FIGS. 7A, 7B, 7C, 7D, 7E, 7F, 7G, 7H, and 7I, which illustrate the removal and installation of the fascia connector 3.

A method to install and remove the fascia connector 3 from the blind assembly is also provided.

The fascia connector 3 is disposed at a position such that the securing counterpart 301 disengages from the securing counterpart 801. The fascia connector 3 is rotated to a position at which the stem 303 can be moved through the opening 203. For example, the handle 304 may be rotated such that the smallest dimension on a cross-section of the stem 303, for example, the width, is parallel to the width of the opening 203. In some embodiments, the fascia connector 3 may be configured such that the stem 303 can move through the opening 203 when the handle 304 is at multiple positions.

The fascia connector 3 is then removed from the receptacle 204 by sliding the stem 303 through the opening 203.

The fascia connector 3 can be installed in the receptacle 204 by reversing the removal steps.

Figure 7A:
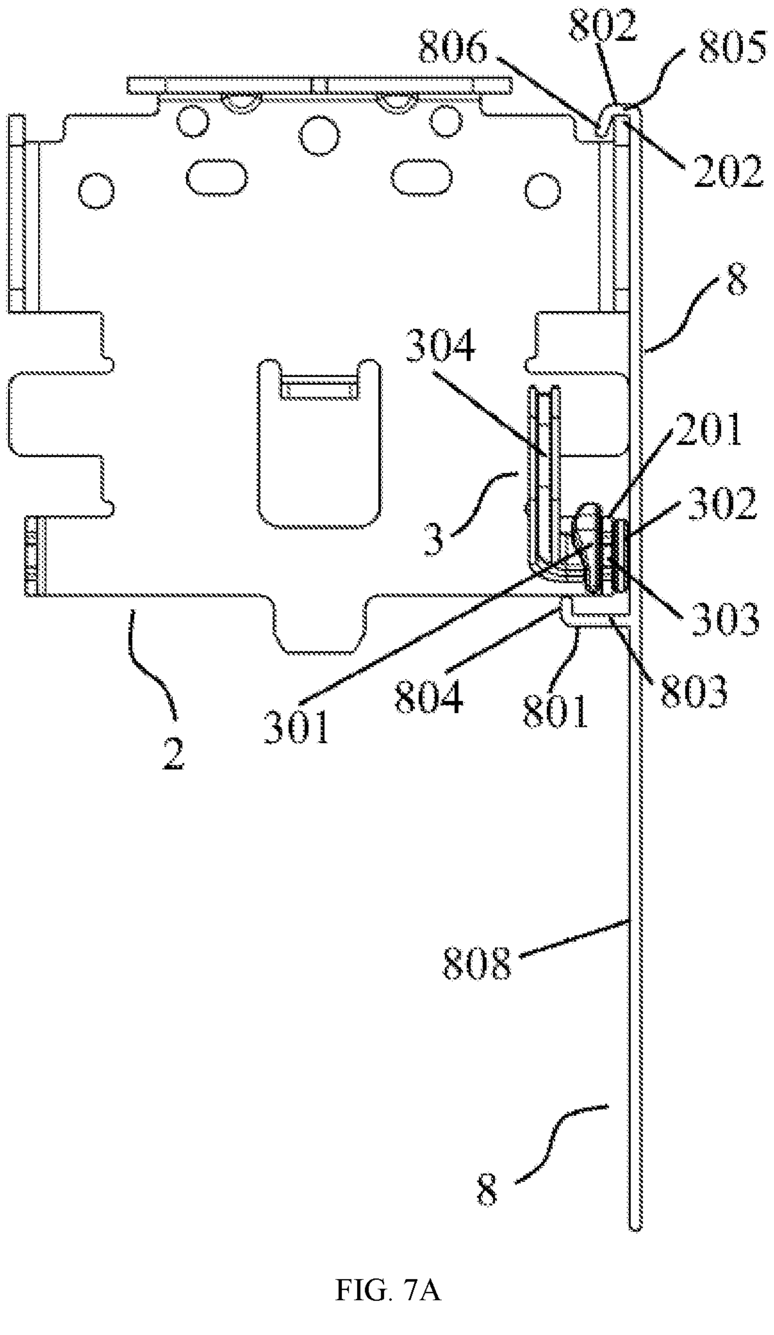
FIGS. 7A, 7B, 7C, 7D, 7E, 7F, 7G, 7H, and 7I illustrate the installation and removal of the fascia connector.
Figure 7B:
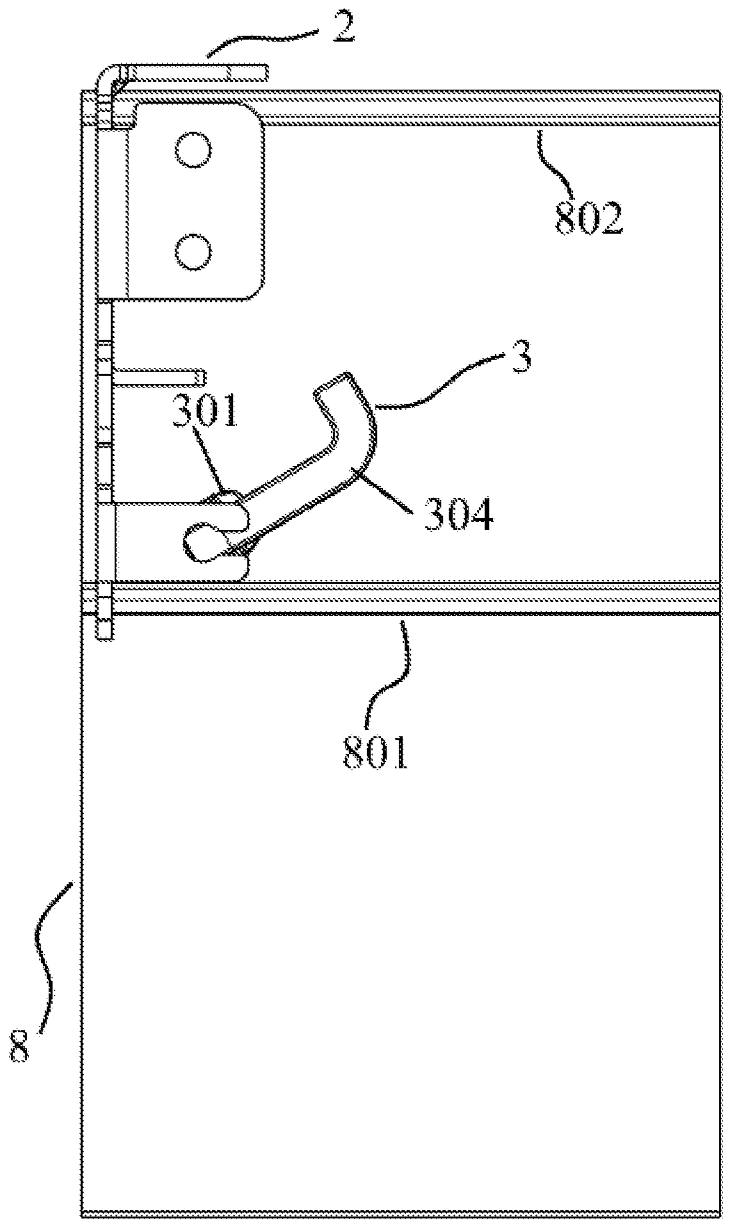
Figure 7C:
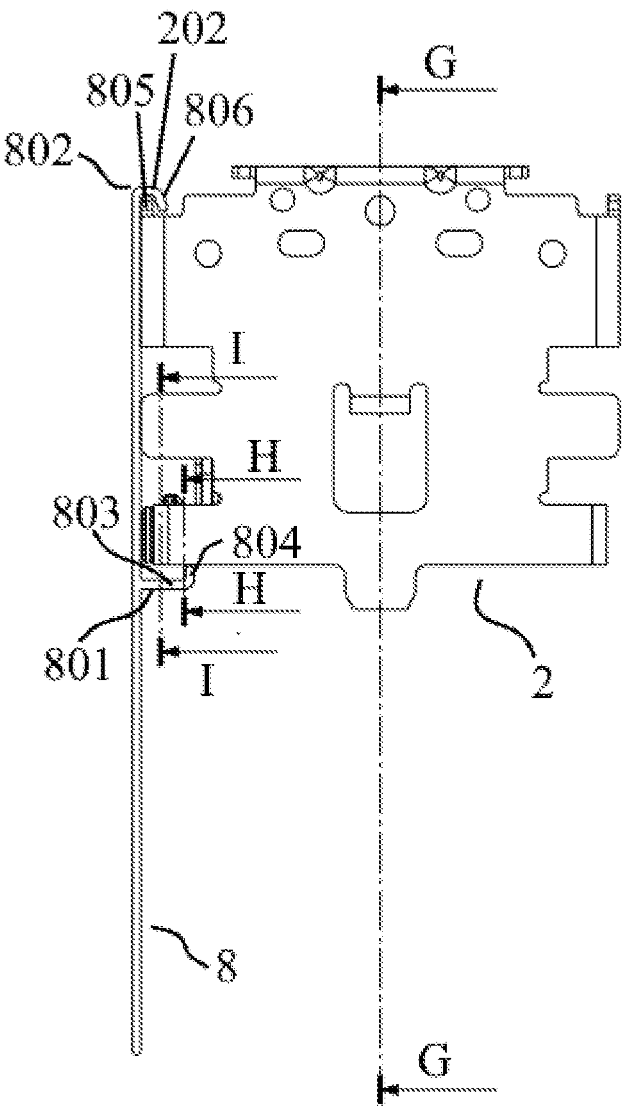
Figure 7D:
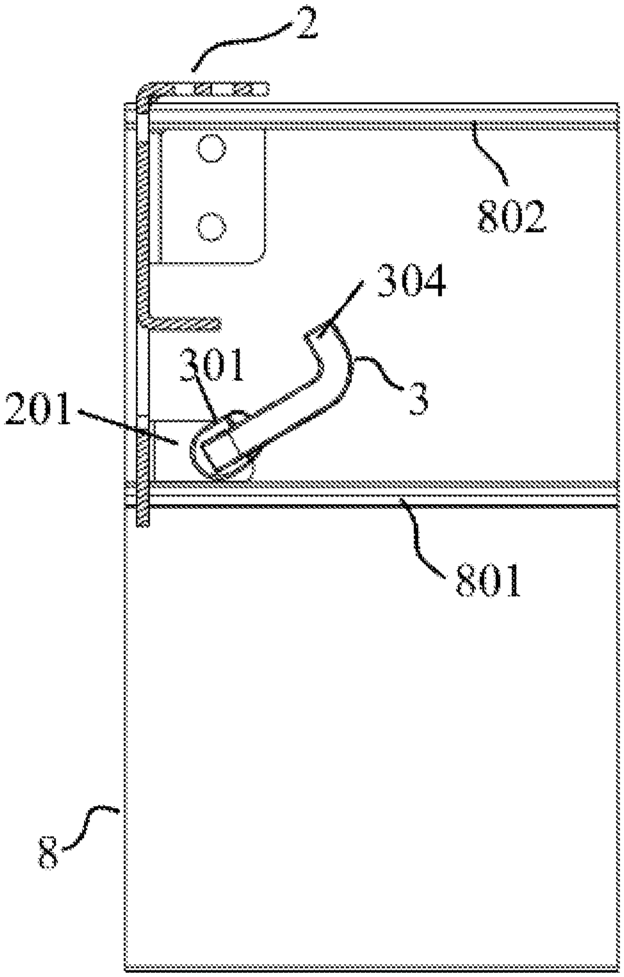
Figure 7E:
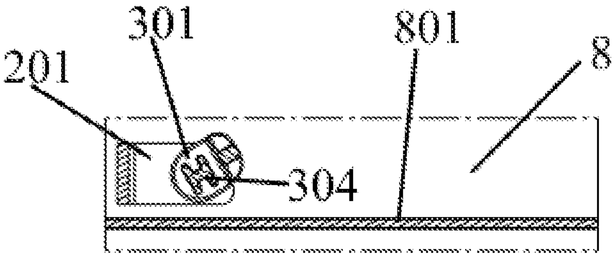
Figure 7F:
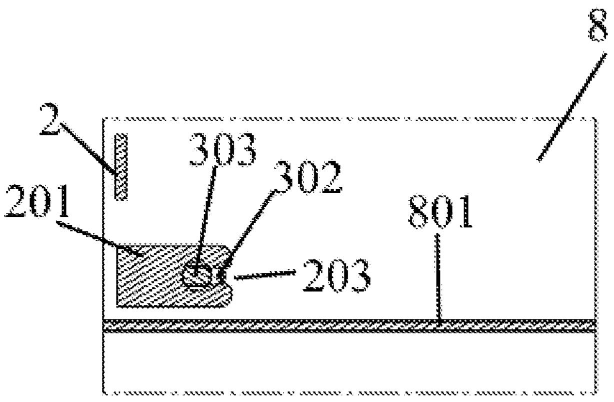
Figure 7G:
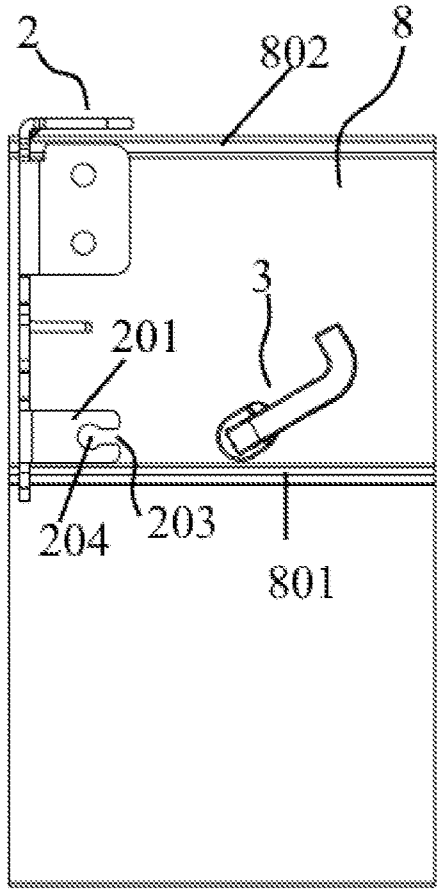
Figure 7H:
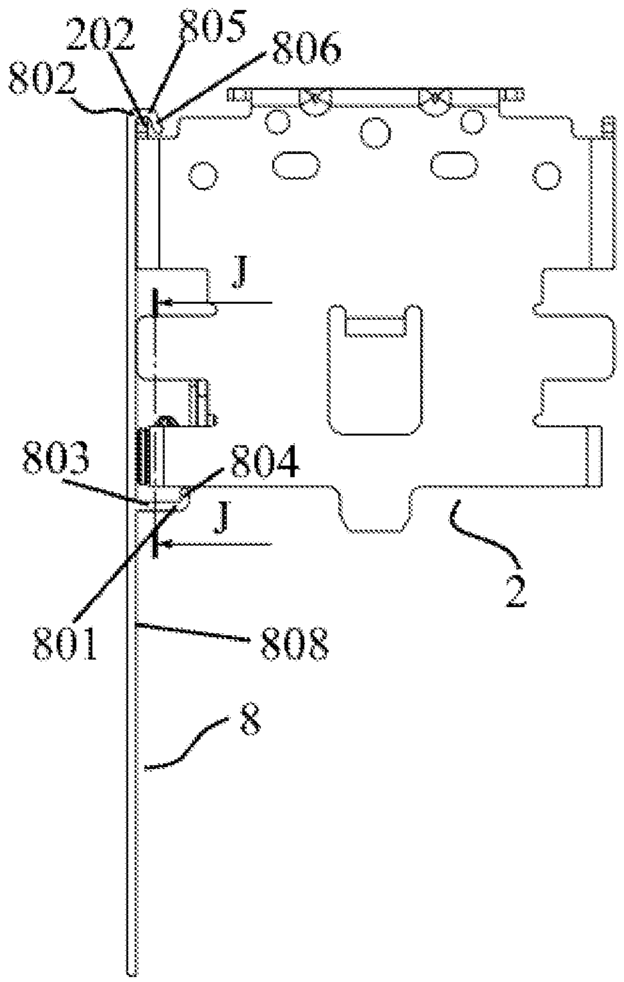
Figure 7I:
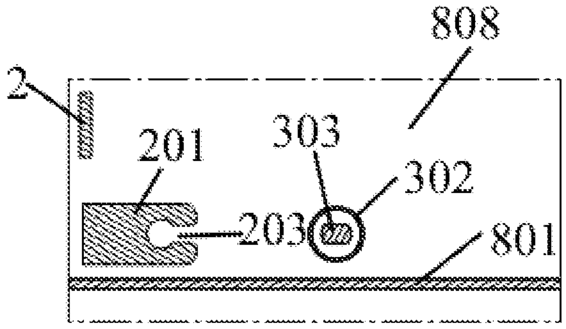

As shown in FIGS. 7D, 7E, and 7F, when the stem 303 is at a position that allows it to be movable through the opening 203, the length of the handle 304 is at an angle to the length of the securing counterpart 801.

A method for installation and removal of the fascia 8 from the end plate 2 is also provided. The fascia 8 is positioned such that the engagement counterpart 802 engages the engagement counterpart 202. The securing counterpart 801 is aligned with the securing counterpart 201. For example, the securing counterpart 201 is substantially parallel to the fascia body 807. The fascia connector 3 is then installed by disposing the stem 303 within the receptacle 204 such that a portion of the securing counterpart 201 including the receptacle 204 is disposed between the securing counterpart 301 and the securing counterpart 302. When the stem 303 is disposed in the receptacle 204, the gravitational force on the handle 304 would cause the fascia connector 3 to rotate such that the stem 303 is at a position that prevents it from moving through the opening 203. As a result, accidental removal of the fascia connector 3 may be prevented.

The fascia connector 3 is then rotated such that the securing counterpart 301 engages the securing counterpart 801, thus securing the fascia 8 to the end plate 2.

The fascia 8 may be removed from the end plate 2 by reversing the installation steps.

The preceding discussion provides many example embodiments. The disclosure includes all reasonably combinations of the elements of the various embodiments.

The term "connected," "attached to" or similar expression may indicate that the elements are directly connected to each other or connected through other components.

Although the embodiments have been described in detail, it should be understood that various changes, substitutions and alterations can be made herein.

Furthermore, the scope of the present application is not intended to be limited to the particular embodiments of the process, machine, manufacture, composition of matter, means, methods and steps described in the specification. As persons skilled in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A mechanism for releasably securing a fascia to an end plate of a blind assembly, the mechanism comprising:

a fascia connector removably attached to the end plate, the fascia connector comprising a first securing counterpart that is generally elongated, a second securing counterpart, and a stem, which has a generally elongated cross-section, that connects the first securing counterpart and the second securing counterpart such that the first securing counterpart, the stem, and the second securing counterpart form a unitary structure, and the first securing counterpart, the stem and the second securing counterpart rotate together; and a handle operatively connected to the stem;

a third securing counterpart configured on the end plate, the third securing counterpart comprises a receptacle and an opening to the receptacle, wherein the opening is sized and shaped such that the stem is movable through the opening when a width of the cross-section is within a predetermined range of angles relative to a width of the opening, while the stem is not movable through the opening when the width of the cross-section is beyond the predetermined range of angles relative to the width of the opening; and the receptacle is sized and shaped such that a movement of the first or the second securing counterpart through the receptacle is blocked;

wherein the first securing counterpart is movable between an engaged position, wherein the first securing counterpart releasably engages a fourth securing counterpart configured on the fascia; and a disengaged position, wherein the first securing counterpart disengages from the fascia;

the third securing counterpart and the second securing counterpart cooperate such that a movement of the fascia connector relative to the end plate is restricted; and the handle is configured such that, when the stem is disposed in the receptacle, a weight of the handle causes the stem to move to a position that prevents the stem from moving through the opening.

2. The mechanism of claim 1, wherein the receptacle defines a generally circular interior surface; and the stem comprises at least two separate rounded surfaces that engage the generally circular interior surface such that a rotation of the stem within the receptacle is facilitated.

3. The mechanism of claim 2, wherein the rounded surfaces are concentric with the circular interior surface.

4. The mechanism of claim 1, wherein the fourth securing counterpart comprises a ledge extending along a length of the fascia from a surface of the fascia toward the end plate; and the ledge is configured to engage the first securing counterpart when the first securing counterpart is in the engaged position.

5. The mechanism of claim 4, wherein the first securing counterpart comprises a portion that defines a generally flat surface for engaging the ledge.

6. The mechanism of claim 5, wherein the fascia further comprises a ridge extending upwardly from the ledge, the ridge engages the first securing counterpart when the first securing counterpart is in the engaged position.

7. The mechanism of claim 6, wherein the first securing counterpart comprises a protrusion that engages the ridge when the first securing counterpart is in the engaged position.

8. The mechanism of claim 1, wherein the fascia further comprises an engagement counterpart disposed away from the fourth securing counterpart, the engagement counterpart configured to engage the end plate.

9. The mechanism of claim 8, wherein the end plate further comprises a protrusion disposed between the engagement counterpart and the fourth securing counterpart, the protrusion is configured to engage the fascia when the fascia is secured.

10. The mechanism of claim 1, wherein the first securing counterpart is generally oblong, oval, or stadium-shaped.

11. A kit for removably securing a fascia to an end plate of a blind assembly, the kit comprising:

a fascia connector comprising a first securing counterpart, the first securing counterpart being generally elongated, the fascia connector configured to removably attach to the end plate, a second securing counterpart, a stem, which has a generally elongated cross-section, that connects the first securing counterpart and the second securing counterpart such that the first securing counterpart, the stem, and the second securing counterpart form a unitary structure, and the first securing counterpart, the stem and the second securing counterpart rotate together, and a handle operatively connected to the stem;

a third securing counterpart configured on the end plate, the third securing counterpart comprising a receptacle and an opening to the receptacle, wherein the opening is sized and shaped such that the stem is movable through the opening when a width of the cross-section is within a predetermined range of angles relative to a width of the opening, while the stem is not movable through the opening when the width of the cross-section is beyond the predetermined range of angles relative to the width of the opening, and the receptacle is sized and shaped such that a movement of the first or the second securing counterpart through the receptacle is blocked;

a fourth securing counterpart configured on the fascia; wherein the fascia connector is movable between an engaged position, wherein the first securing counterpart engages the fourth securing counterpart; and a disengaged position, wherein the first securing counterpart disengages from the fourth securing counterpart; and the handle is configured such that, when the stem is disposed in the receptacle, a weight of the handle causes the stem to move to a position that prevents the stem from moving through the opening.

12. The kit of claim 11, wherein the second securing counterpart and the third securing counterpart cooperate such that a movement of the fascia connector relative to the end plate is restricted.

13. The kit of claim 12, wherein the handle is configured such that the stem is at a position that prevents the stem from moving through the opening to the receptacle when a length of the handle is substantially perpendicular to a width of the opening.

* * * * *